United States Patent Office 3,170,076
Patented Feb. 16, 1965

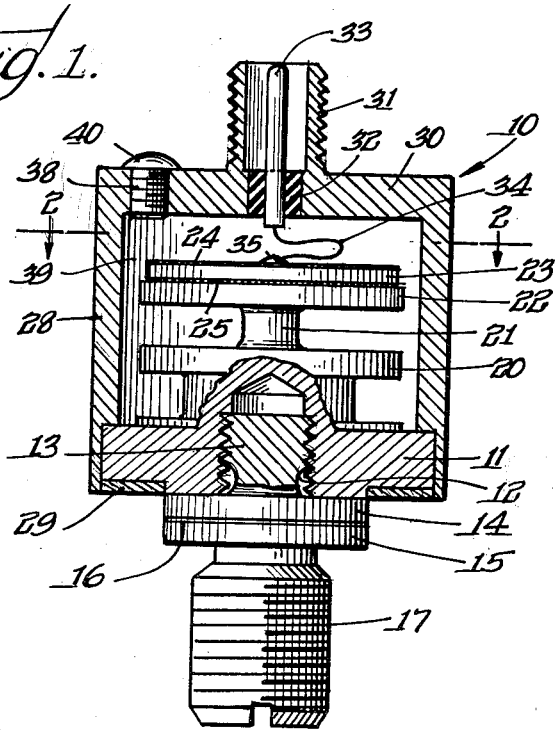

3,170,076
ACCELEROMETER
Thomas Wing, New Brunswick, N.J., assignor to Gulton Industries, Inc., Metuchen, N.J., a corporation of New Jersey
Filed Nov. 1, 1962, Ser. No. 234,776
4 Claims. (Cl. 310—8.4)

The principal object of this invention is to provide an accelerometer which may be of the type disclosed in Dranetz Patent No. 2,808,522 and which is provided with viscous liquid damping for producing optimum damping and substantially constant electrical output signals per vibration input forces (substantially flat frequency response) over a wide range of vibration frequencies.

Briefly, the accelerometer includes a base which is provided with means for securing the base to an object to be vibrated for vibrating the base in accordance with the vibrations of the object. A substantially circular disc-shaped armature is centrally supported by the base and is flexed about its center in accordance with the vibrations imparted to the base. A thin piezoelectric element provided with electrodes on the faces thereof is secured in face abutting relation to the armature and is stressed in accordance with the flexing of the armature for producing electrical output signals at the electrodes in accordance with the vibrations. A housing is sealed to the base and it has a substantially cylindrical cavity enclosing and substantially concentrically encompassing the armature and providing an annular space between the armature and the housing.

In accordance with this invention, viscous damping liquid fills the cavity about the armature and it is displaced from one side of the armature to the other through the annular space between the periphery of the armature and the housing in an unchoked but restrained laminar flow as the armature is flexed by the vibrations for damping the flexing movement of the armature. In this connection, it has been determined that the damping increases with an increase in the ratio of the area of the armature to the area of the annular space between the periphery of the armature and the housing, provided unchoked but restrained laminar flow of the damping fluid through the annular space is maintained. If the ratio is too small, there will be no restraint to the flow of the damping fluid through the annular space and the amount of damping will be relatively small. On the other hand, if the ratio is so large as to choke the flow of the damping liquid through the annular space, substantially no damping occurs, there merely being compression and cavitation of the damping liquid on opposite sides of the armature upon flexing of the armature. In either instance, substantially flat frequency response is not provided, there being considerable change in the electrical output signals per vibration input forces over relatively wide ranges of vibration frequencies.

Accordingly, also in accordance with this invention, the ratio of the area of the armature to the area of the annular space between the periphery of the armature and the housing is preferably maintained within the approximate range of 3:1 to 4:1 and most preferably approximately 3.5:1 for optimum results in producing substantial damping and in producing substantially constant electrical output signals per vibration input forces (substantially flat frequency response) over a wide range of vibration frequencies. For example, substantially flat frequency response, within plus or minus 5%, is readily obtained over a frequency range of 2,000 to 10,000 cycles per second with accelerations ranging from .05 g. to 500 g. By utilizing such ratios, unchoked but restrained laminar flow of the damping fluid through the annular space and maximum damping are provided for obtaining these optimum damping results.

The volumes of the viscous damping liquid on opposite sides of the armature operate as masses loading the armature, there being little, if any, phase shift between the liquid and armature and the liquid and armature moving as a single unit. The damping liquid, therefore, has the effect of decreasing somewhat the resonant frequency of the accelerometer and increasing the sensitivity thereof. Because it is usually desirable to maintain a relatively high resonant frequency, it is preferable to maintain the volume of the viscous damping liquid at a minimum. For example, with an accelerometer having a total weight of 22 grams, the weight of the viscous damping liquid is preferably about 1 gram or so. More importantly, it is also preferable to maintain the volumes of the viscous damping liquid on opposite sides of the armature substantially the same so as to provide substantially equal loading for both directions of flexing of the armature.

While theoretically the damping constant is dependent upon the viscosity of the viscous damping liquid, the effects of viscosity are very small so that the damping is relatively independent of viscosity. For example, tests with 50 centistoke oil and 100,000 centistoke oil show only a variation in damping of a few percent from extremity to extremity of the range. Particularly good results are obtained by using Dow Corning 510 Silicone fluid with a viscosity of 1,000 centistokes as the viscous damping fluid. Temperature changes have substantially no effect upon the operation of the accelerometer, it having an operating temperature range of −40 to +200° F.

Further objects of this invention reside in the details of construction of the accelerometer and in the cooperative relationships between the component parts thereof.

Other objects and advantages of this invention will become apparent to those skilled in the art upon reference to the accompanying specification, claims and drawing in which:

FIG. 1 is a vertical sectional view through the accelerometer of this invention;

FIG. 2 is a horizontal sectional view taken substantially along the line 2—2 of FIG. 1; and FIG. 3 is a diagrammatic illustration showing the principle of the viscous damping utilized in the accelerometer of this invention.

The accelerometer of this invention is generally designated at 10 in FIGS. 1 and 2. It includes a substantially circular base 11 having a central tapped hole 12 which receives a screw threaded portion 13 of a mounting stud formed in two parts 14 and 15 separated by electrical insulating means 16. The two parts 14 and 15 are suitably secured together by an epoxy resin cement or the like. The part 15 of the mounting stud is provided with a screw threaded extension 17 for mounting the stud and the base 11 on the object being vibrated so as to impart vibratory movement to the base 11. The electrical insulating material 16 operates to electrically isolate the base 11 from the object being vibrated.

The base 11 is provided with a substantially circular extension 20 which in turn carries a center post 21 for centrally supporting a substantially circular disc-shaped armature 22. The extension 20, the post 21 and the armature 22 are preferably formed integrally with the base 11. As the base 11 is vibrated longitudinally by the object being vibrated, those vibrations are imparted through the post 21 to the centrally supported armature 22 to flex the armature 22 about its center toward and away from the base 11 in accordance with the vibrations imparted to the base. Preferably, the base 11 and its extension 20, post 21 and armature 22 and the mounting stud, including its two parts 14 and 15, are formed from stainless steel or the like.

The accelerometer also includes a thin disc-shaped piezoelectric element 23 provided with electrodes 24 and 25 on its opposite faces. The piezoelectric elements 23 may be circular in configuration as illustrated, or it may have a square or other shaped configuration. The piezoelectric element 23 may be formed of suitable ferroelectric material such as barium titanate, lead zirconium titanate, or the like. The element 23 is permanently polarized by the application of a polarizing potential to the electrodes 24 and 25 so as to be piezoelectric for producing electric signals at the electrodes 24 and 25 in accordance with the stressing of the piezoelectric element. The piezoelectric element 23 is secured in face abutting relation to the armature 22 as by securing the electrode 25 to the armature 22 by means of solder or an electrically conducting epoxy resin cement. Thus, the electrode 25 of the piezoelectric element 23 is electrically connected to the armature 22 in addition to being mechanically secured thereto. Thus, as the armature 22 is flexed about its center by the vibrations imparted to base 11, the piezoelectric element 23 is stressed in accordance with the flexing of the armature for producing electrical output signals at the electrodes 24 and 25 in accordance with said vibrations.

The accelerometer also includes a housing 28 having a substantially cylindrical cavity enclosing and substantially concentrically encompassing the armature 22 with an annular space between the periphery of the armature 22 and the housing 28. The housing 28 is secured at one end to the base 11 and is provided with a solder seal 29. The housing 28 is also preferably formed of stainless steel or the like. The other end of the housing 28 is provided with an end wall 30 which in turn is provided with a centrally located sleeve portion 31, the outer surface of which is provided with screw threads. The end wall 30 within the sleeve portion 31 is provided with an opening which receives a glass seal 32 carrying a conductor member 33 and electrically insulating the same from the housing, the conductor member 33 being electrically connected to the electrode 24 by means of a lead 34 soldered to the electrode 24 as indicated at 35. Thus, the electrode 24 is electrically connected to the conductor member 33, and the other electrode 25 is electrically connected to the armature 22, the base 11 and the housing 28 to the sleeve 31. In this way, the sleeve 31 and the conductor member 33 operate to transmit the electrical output signals produced by the piezoelectric element 23 through a suitable cable connected thereto.

The cavity within the housing 28 is filled with a viscous damping liquid 39, it being filled through a tapped hole in the end wall 30 of the housing which is sealed after filling by a set screw 38 and by a solder seal 40. The viscous damping liquid 39 may, for example, be Dow Corning 510 Silicone fluid with a viscosity of 1,000 centistokes, and the amount or weight of the damping fluid is small with respect to the total weight of the accelerometer, as for example, 1 gram in 22 grams. The extension 20 on the base 11 makes the amount of viscous damping liquid 39 substantially the same on each side of the armature 22 so that substantially equal loading of the armature 22 is provided during the flexing of the armature.

The spacing between the periphery of the armature 22 and the housing 28 is critical in order to obtain optimum damping of the armature 22 so as to provide substantially constant electric output signals per vibration forces over a wide range of vibration frequencies. The manner of obtaining this optimum damping is diagrammatically illustrated in FIG. 3 wherein the armature and the housing are diagrammatically illustrated. As the armature flexes, with a motion as indicated by the arrow, liquid is displaced from one side of the armature to the other through the annular space between the armature and the housing. Immediately adjacent the armature and the housing there is a boundary layer of the damping liquid where there is substantially no flow of the damping liquid with respect to the armature and the housing.

If the diameter of the armature is so great with respect to the diameter of the housing so that the boundary layers of the damping liquid substantially contact each other, then the flow of liquid through the annular space is choked off and as a result, there is merely compression and cavitation of the damping liquid on opposite sides of the armature upon flexing of the armature. Under these circumstances, substantially no damping occurs. On the other hand, if the diameter of the armature with respect to the diameter of the housing is so small as to provide unrestrained free flow of the damping liquid through the annular space, the amount of damping will be substantially nil. In accordance with this invention, the diameter of the armature with respect to the diameter of the housing is so selected as to provide a relatively small space between the boundary layers so as to provide an unchoked but restrained laminar flow through the annular space. This unchoked but restrained laminar flow through the annular space provides resistance to the flow therethrough and operates effectively to damp the flexing of the armature. It has been found, in accordance with this invention, that the ratio of the area of the armature to the area of the annular space between the periphery of the armature and the housing should be maintained within the approximate range of 3:1 to 4:1 and most preferably, 3.5:1 for optimum results in producing substantial damping and in producing substantially constant electric output signals for vibration input forces (substantially flat frequency response) over a wide range of vibration frequencies. For example, substantially flat frequency response, within plus or minus 5%, is readily obtained over a frequency range of 2,000 to 10,000 cycles per second with accelerations from .05 g. to 500 g. By utilizing such ratios, unchoked but restrained laminar flow of the viscous damping fluid through the annular space and maximum damping are provided for obtaining these optimum damping results.

While for purposes of illustration one form of this invention has been disclosed, other forms thereof may become apparent to those skilled in the art upon reference to this disclosure and, accordingly, this invention is to be limited only by the scope of the appended claims.

I claim as my invention:

1. An accelerometer comprising a base, means for securing the base to an object to be vibrated for vibrating the base in accordance with the vibrations of the objects, a substantially circular disc-shaped armature centrally supported by the base and flexed about its center toward and away from the base in accordance with the vibrations imparted to the base, a thin piezoelectric element provided with electrodes on the faces thereof and secured in face abutting relation to the armature and stressed in accordance with the flexing of the armature for producing electrical output signals at the electrodes in accordance with said vibrations, a housing sealed to the base and having a substantially cylindrical cavity enclosing and substantially concentrically encompassing the armature with an annular space between the periphery of the armature and the housing, and a viscous damping liquid filling the cavity about the armature and flowing through said annular space between the periphery of the armature and the housing as the armature is flexed by said vibrations for damping the flexing movement of the armature, the ratio of the area of the armature to the area of said annular space between the periphery of the armature and the housing being within the approximate range of 3:1 to 4:1 to provide an unchoked but restrained laminar flow through the annular space for producing optimum damping and substantially constant electrical output signals per vibration forces over a wide range of vibration frequencies.

2. An accelerometer comprising a base, means for securing the base to an object to be vibrated for vibrating the base in accordance with the vibrations of the object, a substantially circular disc-shaped armature centrally supported by the base and flexed about its center toward and away from the base in accordance with the vibrations imparted to the base, a thin piezoelectric element provided with electrodes on the faces thereof and secured in face abutting relation to the armature and stressed in accordance with the flexing of the armature for producing electrical output signals at the electrodes in accordance with said vibrations, a housing sealed to the base and having a substantially cylindrical cavity enclosing and substantially concentrically encompassing the armature with an annular space between the periphery of the armature and the housing, and a viscous damping liquid filling the cavity about the armature and flowing through said annular space between the periphery of the armature and the housing as the armature is flexed by said vibrations for damping the flexing movement of the armature, the ratio of the area of the armature to the area of said annular space between the periphery of the armature and the housing being approximately 3.5:1 to provide an unchoked but restrained laminar flow through the annular space for producing optimum damping and substantially constant electrical output signals per vibration forces over a wide range of vibration frequencies.

3. An accelerometer comprising a base, means for securing the base to an object to be vibrated for vibrating the base in accordance with the vibrations of the object, a substantially circular disc-shaped armature centrally supported by the base and flexed about its center toward and away from the base in accordance with the vibrations imparted to the base, a thin piezoelectric element provided with electrodes on the faces thereof and secured in face abutting relation to the armature and stressed in accordance with the flexing of the armature for producing electrical output signals at the electrodes in accordance with said vibrations, a housing sealed to the base and having a substantially cylindrical cavity enclosing and substantially concentrically encompassing the armature with an annular space between the periphery of the armature and the housing, and a viscous damping liquid filling the cavity about the armature and flowing through said annular space between the periphery of the armature and the housing as the armature is flexed by said vibrations for damping the flexing movement of the armature, the volumes of the viscous damping liquid on opposite sides of the armature being approximately the same, and the ratio of the area of the armature to the area of said annular space between the periphery of the armature and the housing being within the approximate range of 3:1 to 4:1 to provide an unchoked but restrained laminar flow through the annular space for producing optimum damping and substantially constant electrical output signals per vibration forces over a wide range of vibration frequencies.

4. An accelerometer comprising a base, means for securing the base to an object to be vibrated for vibrating the base in accordance with the vibrations of the object, a substantially circular disc-shaped armature centrally supported by the base and flexed about its center toward and away from the base in accordance with the vibrations imparted to the base, a thin piezoelectric element provided with electrodes on the faces thereof and secured in face abutting relation to the armature and stressed in accordance with the flexing of the armature for producing electrical output signals at the electrodes in accordance with said vibrations, a housing sealed to the base and having a substantially cylindrical cavity enclosing and substantially concentrically encompassing the armature with an annular space between the periphery of the armature and the housing, and a viscous damping liquid filling the cavity about the armature and flowing through said annular space between the periphery of the armature and the housing as the armature is flexed by said vibrations for damping the flexing movement of the armature, the volumes of the viscous damping liquid on opposite sides of the armature being approximately the same, and the ratio of the area of the armature to the area of said annular space between the periphery of the armature and the housing being approximately 3.5:1 to provide an unchoked but restrained laminar flow through the annular space for producing optimum damping and substantially constant electrical output signals per vibration forces over a wide range of vibration frequencies.

References Cited in the file of this patent
UNITED STATES PATENTS
2,808,522    Dranetz _____ Oct. 1, 1957